(12) United States Patent     (10) Patent No.: US 9,197,470 B2
Okunev     (45) Date of Patent: Nov. 24, 2015

(54) DATA TRANSMISSION VIA MULTI-PATH CHANNELS USING ORTHOGONAL MULTI-FREQUENCY SIGNALS WITH DIFFERENTIAL PHASE SHIFT KEYING MODULATION

(75) Inventor: Yuri Okunev, Middle Island, NY (US)

(73) Assignee: Innurvation, Inc., Glen Burnie, MD (US)

( * ) Notice: Subject to any disclaimer, the term of this patent is extended or adjusted under 35 U.S.C. 154(b) by 899 days.

(21) Appl. No.: 12/245,952

(22) Filed: Oct. 6, 2008

(65) Prior Publication Data

US 2009/0092196 A1     Apr. 9, 2009

Related U.S. Application Data

(60) Provisional application No. 60/977,684, filed on Oct. 5, 2007.

(51) Int. Cl.
*H04L 27/28* (2006.01)
*H04L 27/20* (2006.01)
*H04L 27/26* (2006.01)

(52) U.S. Cl.
CPC .......... *H04L 27/206* (2013.01); *H04L 27/2602* (2013.01); *H04L 27/2627* (2013.01); *H04L 27/2662* (2013.01); *H04L 27/2675* (2013.01)

(58) Field of Classification Search
CPC .......................... H04L 27/206; H04L 27/2627
USPC ........................... 375/260, 308, 331, 208, 259
See application file for complete search history.

(56) References Cited

U.S. PATENT DOCUMENTS

| | | | |
|---|---|---|---|
| 3,569,955 A * | 3/1971 | Maniere | 341/56 |
| 4,987,897 A | 1/1991 | Funke | |
| 5,251,326 A | 10/1993 | Silverman | |
| 5,265,603 A | 11/1993 | Hudrlik | |
| 5,267,033 A | 11/1993 | Hoshino | |
| 5,279,607 A | 1/1994 | Schentag et al. | |
| 5,329,498 A | 7/1994 | Greenstein | |
| 5,395,366 A | 3/1995 | D'Andrea et al. | |
| 5,522,865 A | 6/1996 | Schulman et al. | |
| 5,559,757 A | 9/1996 | Catipovic et al. | |
| 5,604,531 A | 2/1997 | Iddan et al. | |

(Continued)

FOREIGN PATENT DOCUMENTS

| | | | |
|---|---|---|---|
| EP | 1 492 352 A2 | 12/2004 | |
| EP | 1 654 983 A1 | 5/2006 | |

(Continued)

*Primary Examiner* — Kevin M Burd
(74) *Attorney, Agent, or Firm* — Sterne, Kessler, Goldstein & Fox P.L.L.C.

(57) ABSTRACT

A method and an apparatus relating to an OFDM data communications system where the sub-carriers are modulated using differential quadrature phase-shift keying (DQPSK). The multi-carrier transmitted signal is directly generated using a summation of pre-computed sample points. As part of the multi-carrier signal generation, a signal for the guard interval is established. In an acoustic application of this approach, direct radiation of the sub-carrier approach is facilitated. Symbol synchronization in the receiver is based on signal correlation with the missed sub-carrier. Separation of the sub-carriers in the receiver uses a correlation of the received signal and reference signals that are derived from a table of pre-computed values. Optimal non-coherent processing of the sub-carriers without any phase tracking procedures is achieved.

15 Claims, 11 Drawing Sheets

(56) References Cited

U.S. PATENT DOCUMENTS

| | | | |
|---|---|---|---|
| 5,741,311 A | 4/1998 | Mc Venes et al. |
| 5,744,898 A | 4/1998 | Smith et al. |
| 5,796,827 A | 8/1998 | Coppersmith et al. |
| 5,833,603 A | 11/1998 | Kovacs et al. |
| 5,984,875 A | 11/1999 | Brune |
| 6,076,016 A | 6/2000 | Feierbach |
| 6,104,913 A | 8/2000 | McAllister |
| 6,115,636 A | 9/2000 | Ryan |
| 6,198,965 B1 | 3/2001 | Penner et al. |
| 6,211,799 B1 | 4/2001 | Post et al. |
| 6,239,724 B1 | 5/2001 | Doron et al. |
| 6,240,312 B1 | 5/2001 | Alfano et al. |
| 6,380,858 B1 | 4/2002 | Yarin et al. |
| 6,431,175 B1 | 8/2002 | Penner et al. |
| 6,486,588 B2 | 11/2002 | Doron et al. |
| 6,504,286 B1 | 1/2003 | Porat et al. |
| 6,584,348 B2 | 6/2003 | Glukhovsky |
| 6,597,320 B2 | 7/2003 | Maeda et al. |
| 6,628,989 B1 | 9/2003 | Penner et al. |
| 6,702,755 B1 | 3/2004 | Stasz et al. |
| 6,720,709 B2 | 4/2004 | Porat et al. |
| 6,754,472 B1 | 6/2004 | Williams et al. |
| 6,764,446 B2 | 7/2004 | Wolinsky et al. |
| 6,845,190 B1 | 1/2005 | Smithwick et al. |
| 6,847,844 B2 | 1/2005 | Sun et al. |
| 6,867,753 B2 | 3/2005 | Chinthammit et al. |
| 6,904,308 B2 | 6/2005 | Frisch et al. |
| 6,934,573 B1 | 8/2005 | Glukhovsky et al. |
| 6,936,003 B2 | 8/2005 | Iddan |
| 6,939,292 B2 | 9/2005 | Mizuno |
| 6,944,316 B2 | 9/2005 | Glukhovsky et al. |
| 6,950,690 B1 | 9/2005 | Meron et al. |
| 6,984,205 B2 | 1/2006 | Gazdzinski |
| 7,009,634 B2 | 3/2006 | Iddan et al. |
| 7,024,248 B2 | 4/2006 | Penner et al. |
| 7,039,453 B2 | 5/2006 | Mullick et al. |
| 7,076,212 B1* | 7/2006 | Doi et al. ............... 455/63.1 |
| 7,109,859 B2 | 9/2006 | Peeters |
| 7,118,529 B2 | 10/2006 | Glukhovsky et al. |
| 7,118,531 B2 | 10/2006 | Krill |
| 7,160,258 B2 | 1/2007 | Imran et al. |
| 7,161,164 B2 | 1/2007 | Glukhovsky |
| 7,195,588 B2 | 3/2007 | Homan et al. |
| 7,200,253 B2 | 4/2007 | Glukhovsky et al. |
| 7,295,226 B1 | 11/2007 | Meron et al. |
| 7,307,544 B2 | 12/2007 | Kim et al. |
| 7,336,833 B2 | 2/2008 | Horn |
| 7,354,397 B2 | 4/2008 | Fujita et al. |
| 2001/0035902 A1 | 11/2001 | Iddan et al. |
| 2002/0021715 A1* | 2/2002 | Matheus et al. ............. 370/480 |
| 2002/0138009 A1 | 9/2002 | Brockway et al. |
| 2002/0165592 A1 | 11/2002 | Glukhovsky et al. |
| 2002/0173718 A1 | 11/2002 | Frisch et al. |
| 2002/0177779 A1 | 11/2002 | Adler et al. |
| 2003/0013370 A1 | 1/2003 | Glukhovsky |
| 2003/0043263 A1 | 3/2003 | Glukhovsky et al. |
| 2003/0045790 A1 | 3/2003 | Lewkowicz et al. |
| 2003/0114742 A1 | 6/2003 | Lewkowicz et al. |
| 2003/0139661 A1 | 7/2003 | Kimchy et al. |
| 2003/0195415 A1 | 10/2003 | Iddan |
| 2004/0008618 A1* | 1/2004 | Shirakata et al. ............. 370/208 |
| 2004/0032187 A1 | 2/2004 | Penner et al. |
| 2004/0114856 A1 | 6/2004 | Kubby et al. |
| 2004/0122315 A1 | 6/2004 | Krill |
| 2004/0199222 A1 | 10/2004 | Sun et al. |
| 2004/0202339 A1 | 10/2004 | O'Brien, Jr. et al. |
| 2004/0204744 A1 | 10/2004 | Penner et al. |
| 2004/0236182 A1 | 11/2004 | Iddan et al. |
| 2004/0258328 A1 | 12/2004 | Adler |
| 2005/0025368 A1 | 2/2005 | Glukhovsky |
| 2005/0075555 A1 | 4/2005 | Glukhovsky et al. |
| 2005/0088299 A1 | 4/2005 | Bandy et al. |
| 2005/0110881 A1 | 5/2005 | Glukhovsky et al. |
| 2005/0143644 A1 | 6/2005 | Gilad et al. |
| 2005/0148816 A1 | 7/2005 | Glukhovsky et al. |
| 2005/0159643 A1 | 7/2005 | Zinaty et al. |
| 2005/0159789 A1 | 7/2005 | Brockway et al. |
| 2005/0187433 A1 | 8/2005 | Horn et al. |
| 2005/0222490 A1 | 10/2005 | Glukhovsky et al. |
| 2005/0228259 A1 | 10/2005 | Glukhovsky et al. |
| 2005/0272974 A1 | 12/2005 | Iddan |
| 2005/0281446 A1 | 12/2005 | Glukhovsky et al. |
| 2006/0004256 A1 | 1/2006 | Gilad et al. |
| 2006/0009818 A1 | 1/2006 | Von Arx et al. |
| 2006/0013185 A1* | 1/2006 | Seo et al. ............... 370/343 |
| 2006/0045118 A1 | 3/2006 | Hyoung et al. |
| 2006/0074275 A1 | 4/2006 | Davidson et al. |
| 2006/0082648 A1 | 4/2006 | Iddan et al. |
| 2006/0092908 A1 | 5/2006 | Sung et al. |
| 2006/0114814 A1* | 6/2006 | Kasami et al. ............... 370/208 |
| 2006/0116584 A1 | 6/2006 | Sudol et al. |
| 2006/0132599 A1 | 6/2006 | Iddan et al. |
| 2006/0147037 A1 | 7/2006 | Boschetti |
| 2006/0155174 A1 | 7/2006 | Glukhovsky et al. |
| 2006/0158512 A1 | 7/2006 | Iddan et al. |
| 2006/0184039 A1 | 8/2006 | Avni et al. |
| 2006/0192889 A1 | 8/2006 | Iddan et al. |
| 2006/0245513 A1* | 11/2006 | Koo et al. ............... 375/267 |
| 2006/0252371 A1 | 11/2006 | Yanagida |
| 2007/0002604 A1 | 1/2007 | Lin et al. |
| 2007/0043310 A1 | 2/2007 | Trandafir et al. |
| 2007/0047665 A1* | 3/2007 | Friend ............ 375/260 |
| 2007/0060979 A1 | 3/2007 | Strother et al. |
| 2007/0123772 A1 | 5/2007 | Euliano et al. |
| 2007/0155336 A1* | 7/2007 | Nam et al. ............... 455/69 |
| 2007/0213659 A1 | 9/2007 | Trovato et al. |
| 2007/0282156 A1 | 12/2007 | Konings |
| 2008/0213355 A1 | 9/2008 | Bohmer |
| 2009/0219802 A1* | 9/2009 | Han et al. ............... 370/210 |

FOREIGN PATENT DOCUMENTS

| | | |
|---|---|---|
| EP | 1 676 522 A1 | 7/2006 |
| EP | 1 693 000 A2 | 8/2006 |
| EP | 1 698 278 A1 | 9/2006 |
| EP | 1 704 812 A1 | 9/2006 |
| EP | 1 737 124 A2 | 12/2006 |
| GB | 2 414 408 A | 11/2005 |
| WO | WO 02/055126 A2 | 7/2002 |
| WO | WO 02/080753 A2 | 10/2002 |
| WO | WO 02/089913 A2 | 11/2002 |
| WO | WO 03/010967 A1 | 2/2003 |
| WO | WO 03/028224 A2 | 4/2003 |
| WO | WO 03/053241 A2 | 7/2003 |
| WO | WO 2004/052209 A1 | 6/2004 |
| WO | WO 2004/054430 A2 | 7/2004 |
| WO | WO 2004/058041 A2 | 7/2004 |
| WO | WO 2005/062715 A2 | 7/2005 |
| WO | WO 2006/034125 A2 | 3/2006 |
| WO | WO 2006/059331 A2 | 6/2006 |
| WO | WO 2006/103665 A2 | 10/2006 |
| WO | WO 2006/114649 A1 | 11/2006 |
| WO | WO 2007/028035 A3 | 3/2007 |
| WO | WO 2007/126247 A1 | 11/2007 |
| WO | WO 2007/143200 A2 | 12/2007 |
| WO | WO 2008/014432 A2 | 1/2008 |
| WO | WO 2008/016194 A2 | 2/2008 |

* cited by examiner

DATA TRANSMISSION VIA MULTI-PATH CHANNELS USING ORTHOGONAL MULTI-FREQUENCY SIGNALS WITH DIFFERENTIAL PHASE SHIFT KEYING MODULATION

CROSS REFERENCE TO RELATED APPLICATIONS

The present application claims the benefit of U.S. Provisional Patent Application No. 60/977,684, entitled "Data Transmission Via Multi-Path Channels Using Orthogonal Multi-Frequency Signals with Differential Phase Shift Keying Modulation," filed on Oct. 5, 2007, which is hereby expressly incorporated by reference in its entirety.

BACKGROUND OF THE INVENTION

1. Field of the Invention

The present invention relates to data communications systems, where circuit complexity considerations, processing computation considerations, or DC power considerations significantly constrain available solutions. More specifically, the invention applies to data communication links where multi-path interference is a significant source of performance degradation. In particular, the present invention applies to data communications systems operating through a multi-path acoustic channel. Circumstances involving multi-path acoustic data communications channels include medical applications wherein devices are inserted into animals or humans for diagnostic or therapeutic reasons.

2. Background Art

Modern data communications systems attempt to optimize bandwidth utilization efficiency by deploying complex modulation and encoding schemes of ever increasing complexity. For example, a radio frequency (RF) wireless data communications system using a 64-QAM (Quadrature Amplitude Modulation) modulation scheme achieves a theoretical efficiency of 6 bits per second per Hertz (bps/Hz), and a typical realized efficiency of 3 to 4 bps/Hz. To achieve that optimization, circuit complexity, computation processing requirements, and transmitted power are not significant constraints on the systems designer and therefore the ultimate bandwidth efficiency utilization can be realized.

However, in certain situations, circuit complexity, computational complexity, and the available levels of transmitted power are significant limitations. Examples of such situations are small remote sensor packages, e.g. ingestible medical diagnostic pills for use in animals and humans. In such situations, modest circuit complexity, reduced computation complexity, and limited transmitted power levels are key system design considerations.

Other examples not served well by conventional solutions are situations characterized by significant multi-path propagation such as that caused by multiple reflections from surrounding objects within the channel environment. Such multi-path propagation causes inter-symbol interference (ISI) and signal fading in the time and frequency domains. Thus, ISI and deep fading (such as Rayleigh fading) significantly decrease system performance, restrict data rate, dramatically increase the necessary power, and at times can lead to the complete degradation of data transmission. Examples of such multi-path propagation environments include RF wireless links in building environments, and acoustic transmission channels in proximity to multiple surfaces, areas and boundaries.

In conventional data communications systems, the challenge of multi-path propagation interference is mitigated by the utilization of OFDM (Orthogonal Frequency Division Multiplexing) technology, whose underlying approach capitalizes on the parallel transmission of data by several sub-carriers with a large symbol duration together with a guard interval. However, the conventional OFDM technology is very complex, since it is based on FFT (Fast Fourier Transform) algorithms and PSK (phase shift keying) modulation. FFT algorithms require substantial real-time computations, and PSK modulation requires the use of additional circuitry to generate special pilot signals and for sub-carrier recovery.

What is needed is an approach that solves one or more challenges in a data communications system, namely reduced circuit complexity, reduced computational processing, reduced transmitted power requirements, and improved handling of multi-path interference.

BRIEF SUMMARY OF THE INVENTION

Methods and apparatus for the optimal data transmission in a multi-path environment are described, where reduced circuit complexity, reduced computation processing, and reduced power requirements are significant system design drivers. The counter-intuitive marriage of a differential quadrature phase shift keying (DQPSK) modulation scheme for a frugal implementation of an OFDM sub-carrier system is described. This apparatus may be employed in a data channel wherein multi-path interference is significant. The apparatus may also be deployed in small sensor applications, such as an ingestible pill for animals and humans.

The apparatus may be employed in applications where circuit complexity or computational resources are significant design considerations. One embodiment of the invention enables direct generation of the multi-carrier OFDM signal in the transmitter by the computationally efficient means of summation of samples that are previously stored in a table. Moreover, as a part of the multi-carrier signal generation, a signal for the guard interval in the transmitter may be established. In an acoustic embodiment of this invention, direct radiation of the sub-carrier sum by the acoustic transducer in the transmitter is achievable. In the receiver, symbol synchronization may be achieved based on signal correlation with the "missed" sub-carrier. Accordingly, optimal non-coherent processing of the sub-carriers without any phase tracking procedures may be accomplished. Finally, separation of the sub-carriers in the receiver may be readily achieved by means of correlation of the received signal and reference signals that are derived from a pre-computed tabular set of values.

These and other objects, advantages and features will become readily apparent in view of the following detailed description of the invention. Note that the Summary and Abstract sections may set forth one or more, but not all exemplary embodiments of the present invention as contemplated by the inventor.

BRIEF DESCRIPTION OF THE DRAWINGS/FIGURES

The accompanying drawings, which are incorporated herein and form a part of the specification, illustrate the present invention, and together with the description, further serve to explain the principles of the invention and to enable a person skilled in the pertinent art to make and use the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Methods and apparatus for data communications systems are described. Furthermore, methods and apparatus for a data communications system in an acoustic environment are also described. The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

The example embodiments described herein are provided for illustrative purposes, and are not limiting. Further structural and operational embodiments, including modifications/alterations, will become apparent to persons skilled in the relevant art(s) from the teachings herein.

Figure 1:
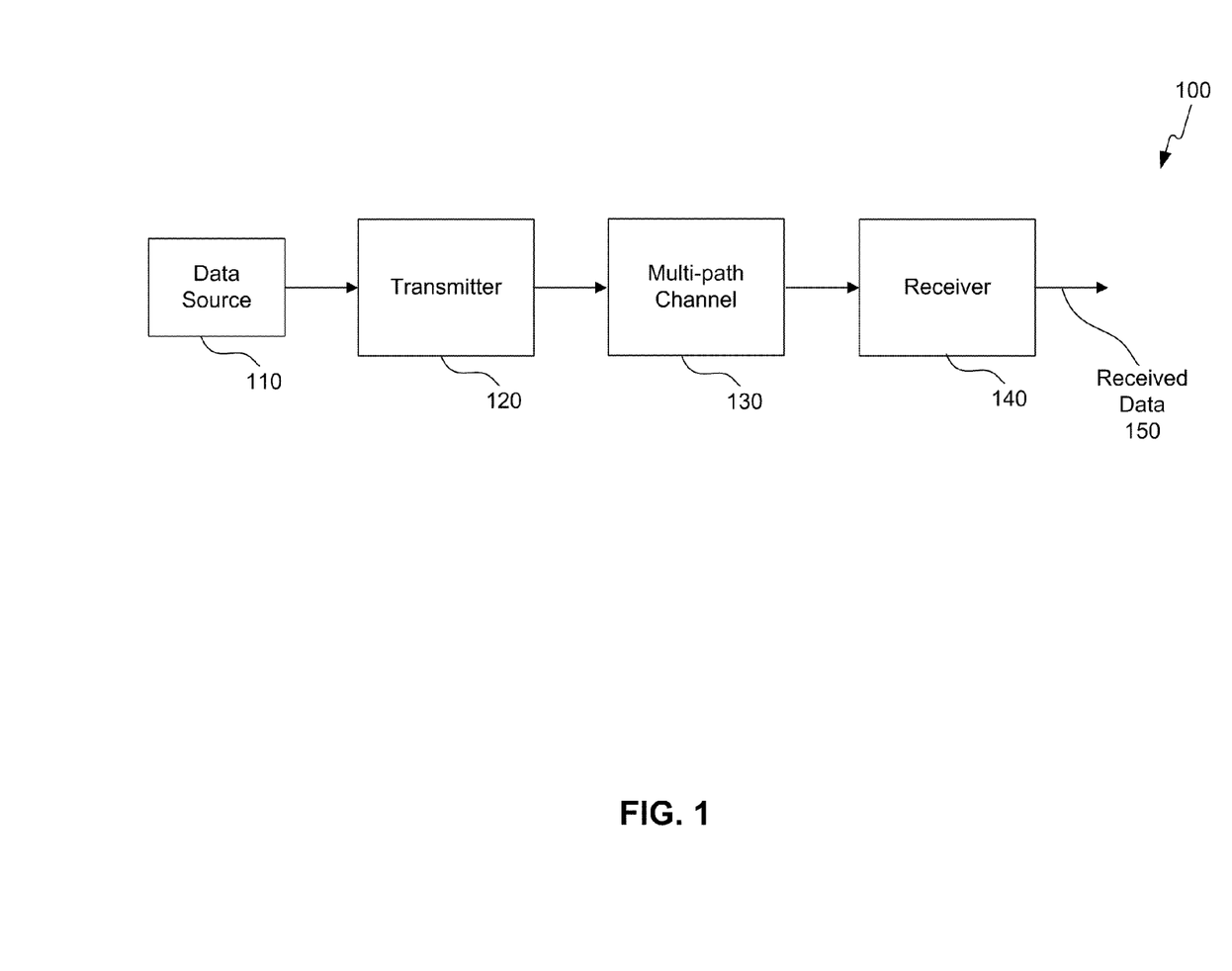
FIG. 1 is a high-level block-diagram of a data transmission system operating in a multi-path channel.

FIG. 1 shows a high-level block diagram of a data transmission system 100, operating over a channel 130 with multipath interference. Input data from a data source 110 is input to the transmitter 120, which broadcasts over the channel 130. The transmitted power is subsequently received by the receiver 140, and is then output as the received data 150.

Figure 2:
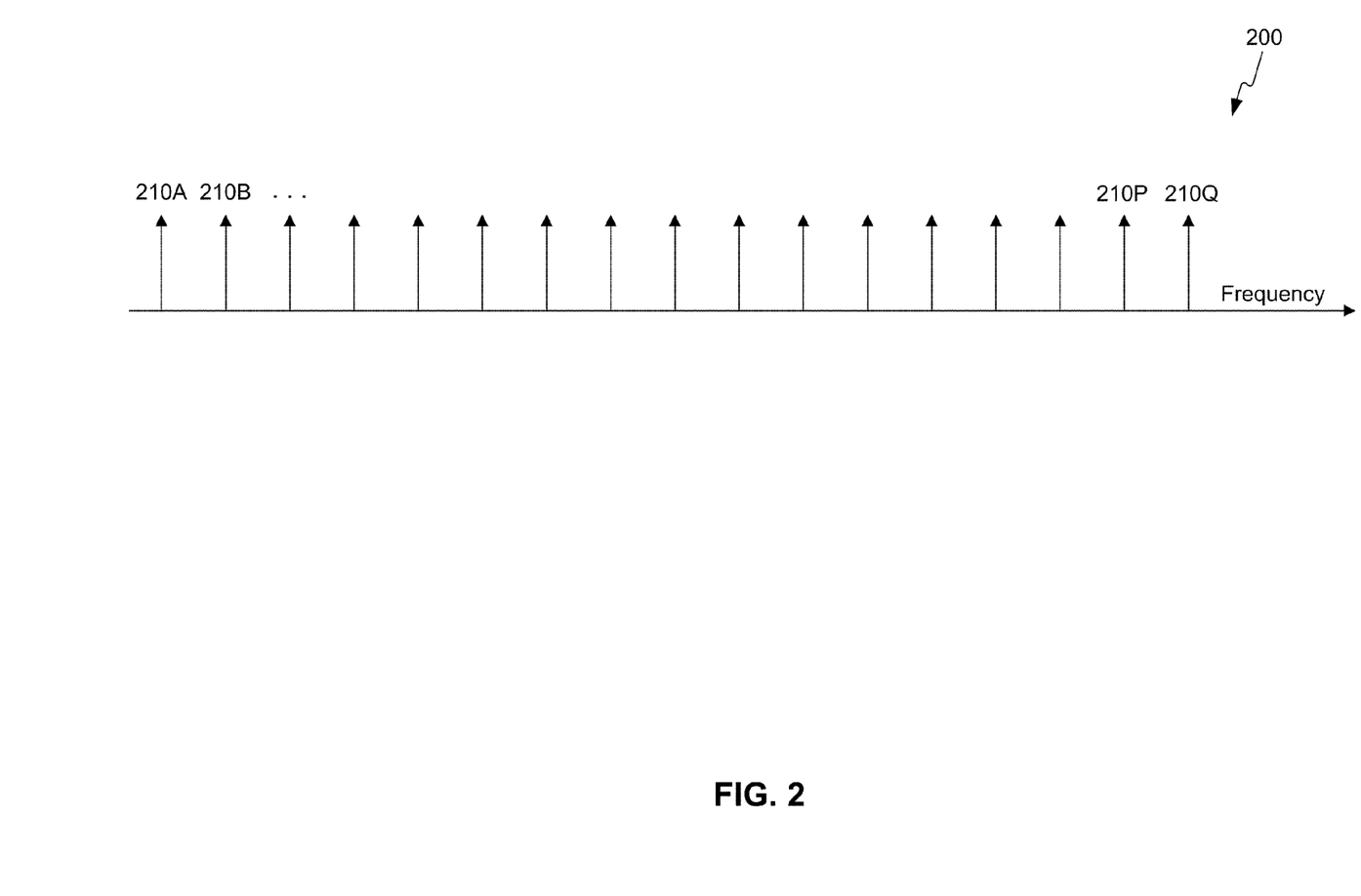
FIG. 2 is an example of an OFDM signal in the frequency domain.
Figure 3:
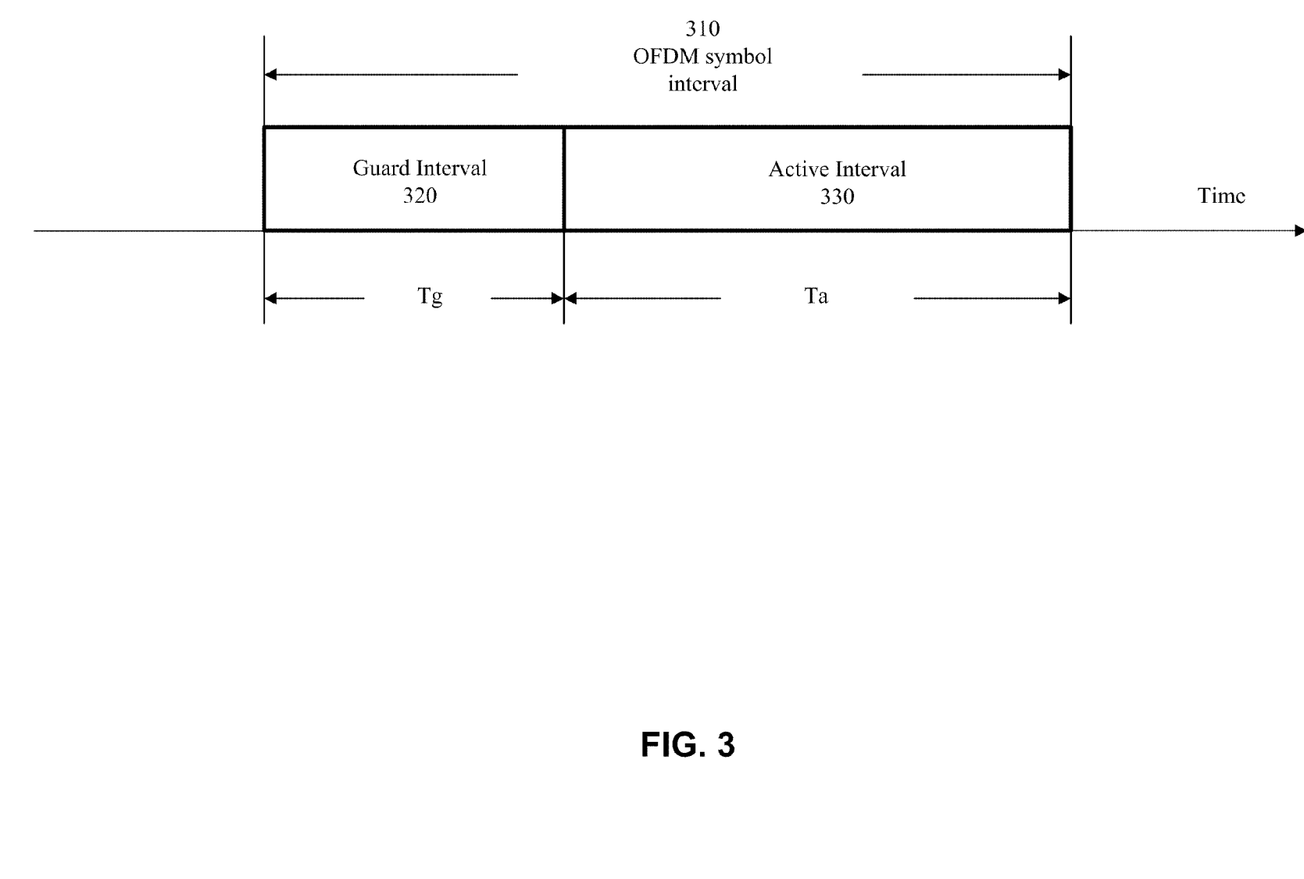
FIG. 3 is an example of an OFDM signal in the time domain.

To overcome the deleterious effects of multi-path effects, modern data communications systems utilize the OFDM (orthogonal frequency divisional multiplexing) carrier approach, which utilizes a multi-carrier signal containing orthogonal sub-carriers. FIG. 2 shows an example of an OFDM signal 200 in the frequency domain. A total of 17 equally-spaced sub-carriers 210A through 210Q are shown in this example. FIG. 3 shows an example of an OFDM signal 300 in the time domain. In OFDM modulation schemes, multiple sub-carriers are each modulated with a conventional modulation scheme, such as, for example, QAM, at a low symbol rate. Guard intervals are provided between intervals of information (active interval). An OFDM symbol interval 310 is defined herein as including two sub-intervals, namely the guard interval 320 and the active interval 330.

Mathematically, an OFDM signal can be represented in the time domain as follows:

$$S(t) = \sum_{k=1}^{K} A_k \sin[(\omega_0 + k*2\pi/T_a)t + \Phi_k], \tag{1}$$

where $A_k$ and $\Phi_k$ are the amplitude and phase of the k-th sub-carrier, $T_a$ is an interval of sub-carrier orthogonality (active interval), and K is the number of sub-carriers.

Many conventional OFDM-based data communications systems utilize the Quadrature Phase Shift Keying (QPSK) encoding technique. In this technique, the transmitter encodes data onto a high frequency carrier by quadrature modulation. However, in order to generate the set of orthogonal sub-carriers in the transmitter, this technique uses inverse Fast Fourier Transforms (IFFTs). Such transforms are comparatively complex computations since they require significant real time arithmetic operations with complex numbers. Moreover, the guard interval is generated by using a cycle prefix, which is also based on the above IFFT results. Within a QPSK-based OFDM receiver, separation of the sub-carrier signals requires the use of a Fast Fourier Transform (FFT), which as noted above, are comparatively complex computational algorithms. Moreover, signal detection in the receiver requires the use of coherent processing and the associated additional circuit complexity of special pilot signals or complex phase tracking. In addition, symbol synchronization in the receiver is based on preamble pulses and pilot signals, which in turn increases the required circuit complexity.

In various embodiments of this invention, the use of a DQPSK encoding technique overcomes many of the circuit complexity and computational demands required under the QPSK technique. Specifically, the QPSK need for a pilot signal as a coherent reference is eliminated in a DQPSK receiver. Moreover, the set of transmitted orthogonal sub-carriers is directly (and therefore more simply) generated by means of summation of a pre-calculated table of samples, rather than from real time computations. No carrier modulation circuitry is required since the sum of the generated sub-carriers is fed to the output transmitter. In addition, the guard band is automatically established during the generation of the multi-carrier signal. Within the receiver, separation of the sub-carrier signals is simplified by using a direct correlation of the received signal and reference signals that are derived from an apriori computed set of values. In a further simplification of the computational requirements, the guard interval is not used in the correlation procedure in this DQPSK approach. Moreover, the signal detection in the receiver is invariant to the initial phases of the sub-carriers, and is non-coherent (does not require a pilot signal). Further, the symbol synchronization is straightforward since it is based on correlation with the missed sub-carrier.

Figure 4:
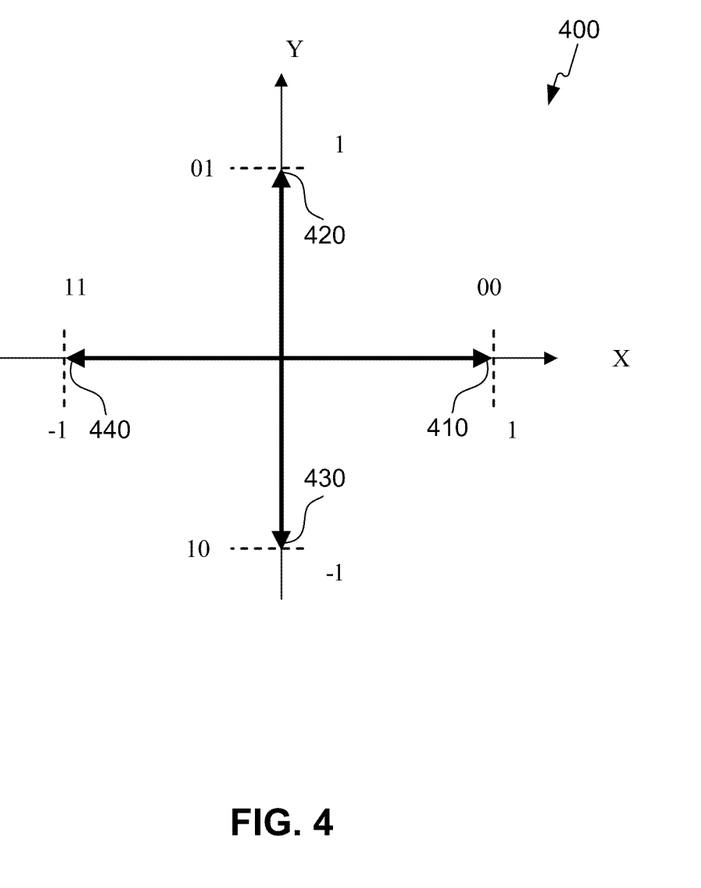
FIG. 4 is an example of DQPSK signals in the phase plane.

FIG. 4 illustrates an example of a DQPSK signal 400 in the phase plane. A total of four symbols are available, namely symbol "00" (410), symbol "01" (420), symbol "10" (430), and symbol "11" (440). The symbols are encoded by transmitted dibits according to Gray code, as shown below in Table 1.

TABLE 1

| Decimal presentation | Dibit transmitted | Phase difference transmitted ΔΦ | cosΔΦ | sinΔΦ |
|---|---|---|---|---|
| 0 | 00 | 0 | 1 | 0 |
| 1 | 01 | π/2 | 0 | 1 |
| 2 | 10 | 3π/2 | 0 | −1 |
| 3 | 11 | Π | −1 | 0 |

Figure 5:
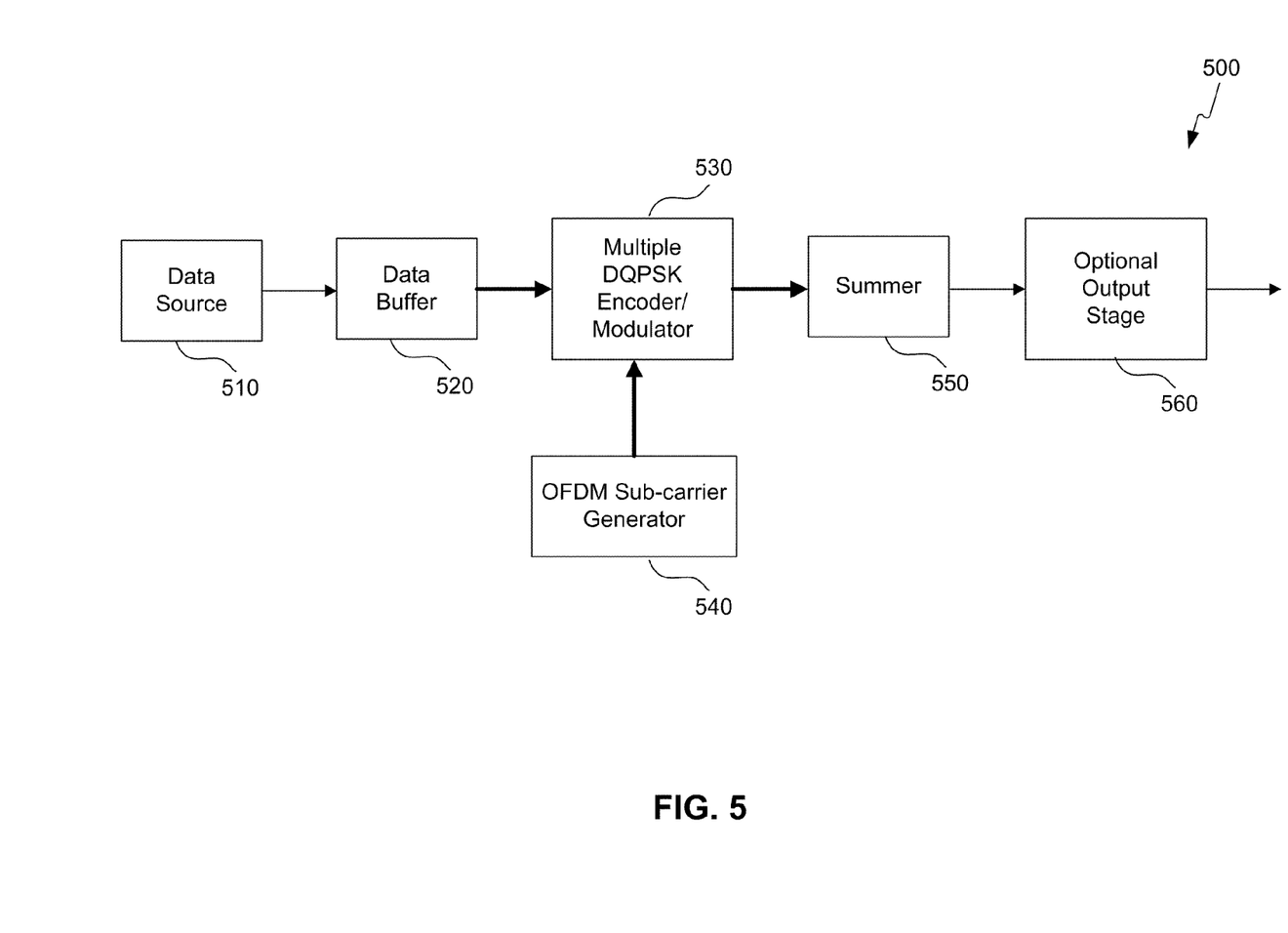
FIG. 5 is an example of an OFDM-DQPSK transmitter, according to an embodiment of the present invention.

FIG. 5 illustrates the architecture of the OFDM-DQPSK transmitter 500, according to an embodiment of this invention. Data source 510 inputs data to data buffer 520, which accumulates data for the current OFDM symbol. For example, in an OFDM-DQPSK system using 16 sub-carriers, the data buffer 520 accumulates 32 bits (4 bytes) of data, and is combined into 16 dibits (one dibit for each sub-carrier). The dibits from data buffer 520 are differentially encoded, and the encoded dibits are input to the multiple DQPSK encoder/modulator 530, where each encoded dibit modulates the corresponding sub-carrier. Also input to the multiple DQPSK encoder/modulator 530 are the sub-carriers which are generated in the OFDM sub-carrier generator 540. The modulated sub-carriers are summed in the summer 550 for input to an optional output stage 560 prior to transmission. Such an optional output stage 560 may include functionality such as frequency upconversion, a transducer, etc., depending on the application.

Figure 6:
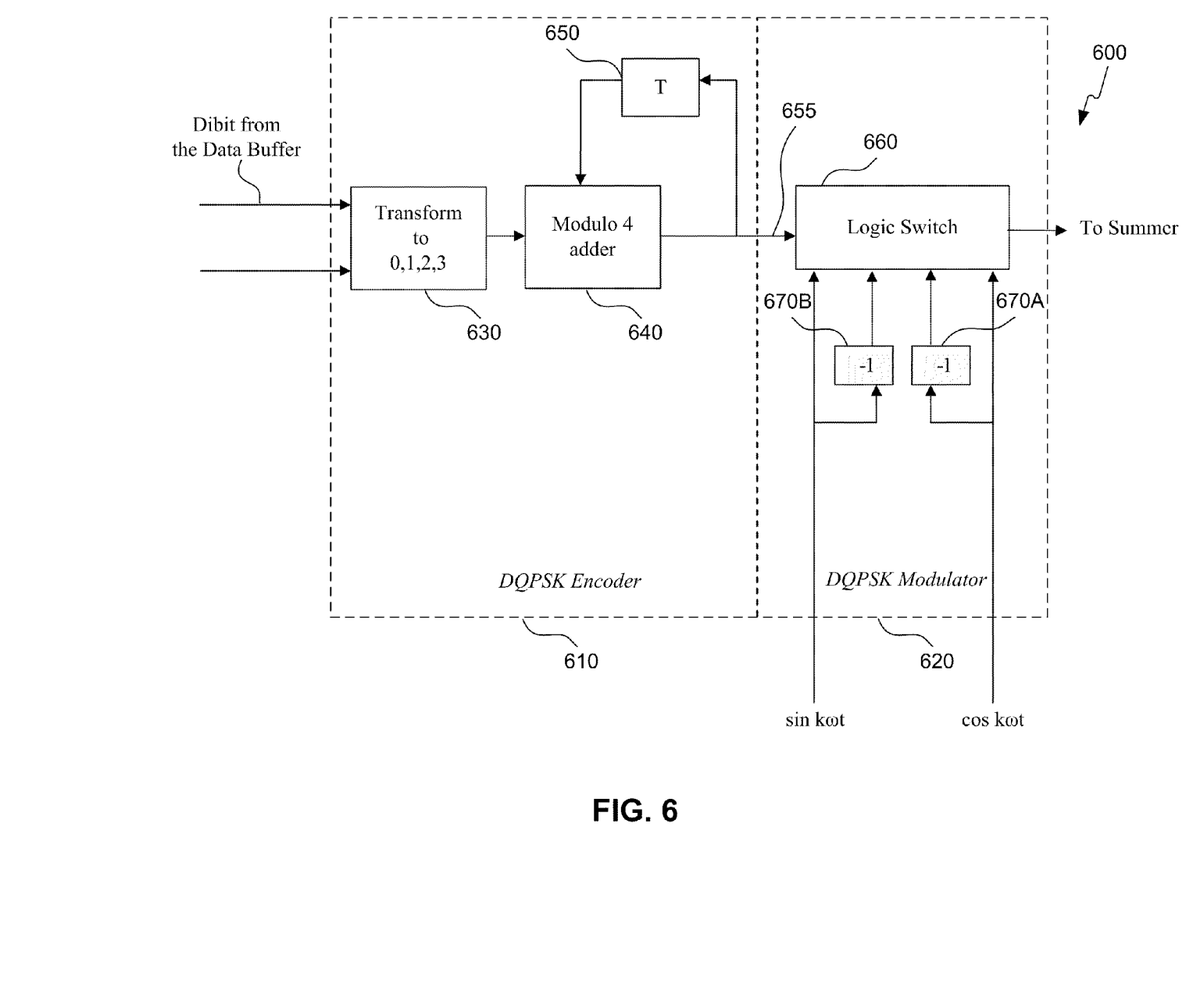
FIG. 6 is an example of a DQPSK encoder/modulator for an OFDM sub-carrier, according to an embodiment of the present invention.

FIG. 6 illustrates the architecture of a DQPSK encoder/modulator 600 for each sub-carrier within an OFDM system, according to an embodiment of this invention. Note that there are a total of K DQPSK encoder/modulators 600 within each multiple DQPSK encoder/modulator 530, where K is the number of sub-carriers. The encoder/modulator 600 is composed of two sub-blocks, namely the DQPSK Encoder 610 and the DQPSK Modulator 620. Output from the data buffer 520 consists of Dibits (i.e. the symbols 00, 01, 10, 11) that are input to the Transform Function 630, that transforms the input data into decimal numbers, for example, to the numbers 0, 1, 2, 3, as shown in the first two columns of Table 1. After this transformation, the decimal number is summed, modulo 4, (640), with a number that was transmitted during the previous OFDM symbol and saved by delay element T (650).

The output of the DQPSK encoder 610 serves as a control signal 655 for the DQPSK modulator 620. The control signal 655 controls a Logic Switch 660 in such a way that the output of the Logic Switch 660 is one of 4 sub-carrier variants ±sin kωt, ±cos kωt according to the following modulation shown in Table 2.

TABLE 2

| Output of the DQPSK Encoder | Output of the DQPSK Modulator | Phase difference transmitted ΔΦ |
|---|---|---|
| 0 | sin (k * 2π/$T_a$)t | 0 |
| 1 | cos (k * 2π/$T_a$)t | π/2 |
| 2 | −cos (k * 2π/$T_a$)t | 3π/2 |
| 3 | −sin (k * 2π/$T_a$)t | π |

All DQPSK encoding operations (decimal transformation, modulo 4 summation, and switch controlling) are performed once per OFDM symbol. Thus, during the OFDM symbol interval, the chosen sub-carrier variant is transmitted without any changes.

Figure 7:
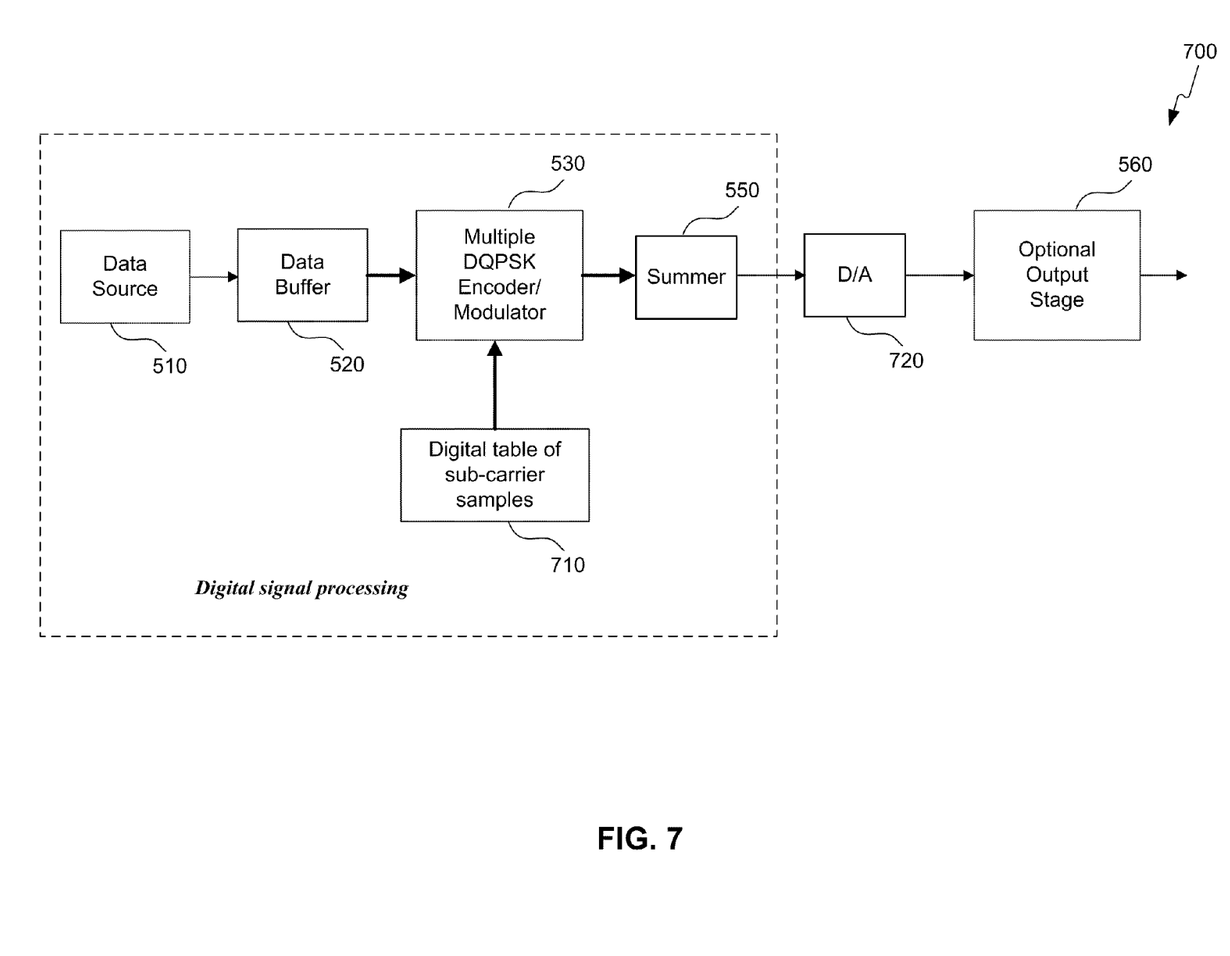
FIG. 7 is an example of a digital version of an OFDM-DQPSK transmitter, according to an embodiment of the present invention.

FIG. 7 illustrates a digital implementation of the OFDM-DQPSK transmitter, according to an embodiment of this invention. Comparing with the general block-diagram in FIG. 5, this transmitter has two different elements: a digital table of sub-carrier samples 710, and a digital-to-analog converter 720. In this case, the sub-carriers are generated by means of reading the table 710, which stores functions sin (k*2π/$T_a$)t and cos (k*2π/$T_a$)t in digital form. The table 710 contains K columns, where K is the number of sub-carriers, and rows, sufficient to represent at least one period of each sub-carrier. An example of such a table 710 is shown in Table 3 below. The table contains 13 columns for 13 sub-carriers and the first 26 rows of samples for those sub-carriers.

TABLE 3

| 1. | 0 | 0 | 0 | 0 | 0 | 0 | 0 | 0 | 0 | 0 | 0 | 0 | 0 |
|---|---|---|---|---|---|---|---|---|---|---|---|---|---|
| 2. | 0.1254 | 0.1266 | 0.1279 | 0.1291 | 0.1303 | 0.1315 | 0.1327 | 0.1340 | 0.1352 | 0.1364 | 0.1376 | 0.1387 | 0.1399 |
| 3. | 0.2170 | 0.2184 | 0.2198 | 0.2211 | 0.2224 | 0.2237 | 0.2250 | 0.2262 | 0.2274 | 0.2286 | 0.2297 | 0.2308 | 0.2319 |
| 4. | 0.2500 | 0.2499 | 0.2498 | 0.2496 | 0.2493 | 0.2490 | 0.2485 | 0.2480 | 0.2475 | 0.2468 | 0.2461 | 0.2453 | 0.2444 |
| 5. | 0.2155 | 0.2126 | 0.2095 | 0.2064 | 0.2031 | 0.1997 | 0.1962 | 0.1926 | 0.1889 | 0.1851 | 0.1813 | 0.1773 | 0.1732 |
| 6. | 0.1229 | 0.1167 | 0.1103 | 0.1039 | 0.0973 | 0.0907 | 0.0840 | 0.0773 | 0.0704 | 0.0636 | 0.0566 | 0.0496 | 0.0426 |
| 7. | −0.0029 | −0.0114 | −0.0200 | −0.0285 | −0.0370 | −0.0454 | −0.0538 | −0.0622 | −0.0704 | −0.0786 | −0.0867 | −0.0947 | −0.1026 |
| 8. | −0.1279 | −0.1364 | −0.1446 | −0.1527 | −0.1605 | −0.1680 | −0.1753 | −0.1822 | −0.1889 | −0.1953 | −0.2014 | −0.2072 | −0.2126 |
| 9. | −0.2184 | −0.2237 | −0.2286 | −0.2330 | −0.2369 | −0.2403 | −0.2432 | −0.2456 | −0.2475 | −0.2488 | −0.2497 | −0.2500 | −0.2498 |
| 10. | −0.2500 | −0.2494 | −0.2482 | −0.2463 | −0.2438 | −0.2407 | −0.2369 | −0.2324 | −0.2274 | −0.2218 | −0.2155 | −0.2088 | −0.2014 |
| 11. | −0.2141 | −0.2064 | −0.1980 | −0.1889 | −0.1793 | −0.1690 | −0.1583 | −0.1469 | −0.1352 | −0.1229 | −0.1103 | −0.0973 | −0.0840 |
| 12. | −0.1204 | −0.1064 | −0.0920 | −0.0773 | −0.0622 | −0.0468 | −0.0313 | −0.0157 | −0.0000 | 0.0157 | 0.0313 | 0.0468 | 0.0622 |
| 13. | 0.0057 | 0.0228 | 0.0398 | 0.0566 | 0.0732 | 0.0894 | 0.1052 | 0.1204 | 0.1352 | 0.1492 | 0.1626 | 0.1753 | 0.1871 |
| 14. | 0.1303 | 0.1458 | 0.1605 | 0.1742 | 0.1871 | 0.1988 | 0.2095 | 0.2191 | 0.2274 | 0.2345 | 0.2403 | 0.2447 | 0.2478 |
| 15. | 0.2198 | 0.2286 | 0.2359 | 0.2418 | 0.2461 | 0.2488 | 0.2500 | 0.2495 | 0.2475 | 0.2438 | 0.2386 | 0.2319 | 0.2237 |

TABLE 3-continued

| | | | | | | | | | | | | |
|---|---|---|---|---|---|---|---|---|---|---|---|---|
| 16. | 0.2499 | 0.2484 | 0.2450 | 0.2399 | 0.2330 | 0.2243 | 0.2141 | 0.2023 | 0.1889 | 0.1742 | 0.1583 | 0.1411 | 0.1229 |
| 17. | 0.2126 | 0.1997 | 0.1851 | 0.1690 | 0.1515 | 0.1327 | 0.1129 | 0.0920 | 0.0704 | 0.0482 | 0.0257 | 0.0029 | −0.0200 |
| 18. | 0.1179 | 0.0960 | 0.0732 | 0.0496 | 0.0257 | 0.0014 | −0.0228 | −0.0468 | −0.0704 | −0.0934 | −0.1154 | −0.1364 | −0.1560 |
| 19. | −0.0086 | −0.0342 | −0.0594 | −0.0840 | −0.1077 | −0.1303 | −0.1515 | −0.1711 | −0.1889 | −0.2047 | −0.2184 | −0.2297 | −0.2386 |
| 20. | −0.1327 | −0.1549 | −0.1753 | −0.1935 | −0.2095 | −0.2231 | −0.2340 | −0.2421 | −0.2475 | −0.2499 | −0.2493 | −0.2458 | −0.2395 |
| 21. | −0.2211 | −0.2330 | −0.2418 | −0.2475 | −0.2499 | −0.2491 | −0.2450 | −0.2378 | −0.2274 | −0.2141 | −0.1980 | −0.1793 | −0.1583 |
| 22. | −0.2498 | −0.2468 | −0.2403 | −0.2303 | −0.2170 | −0.2006 | −0.1813 | −0.1594 | −0.1352 | −0.1090 | −0.0813 | −0.0524 | −0.0228 |
| 23. | −0.2111 | −0.1926 | −0.1711 | −0.1469 | −0.1204 | −0.0920 | −0.0622 | −0.0313 | −0.0000 | 0.0313 | 0.0622 | 0.0920 | 0.1204 |
| 24. | −0.1154 | −0.0854 | −0.0538 | −0.0214 | 0.0114 | 0.0440 | 0.0759 | 0.1064 | 0.1352 | 0.1615 | 0.1851 | 0.2056 | 0.2224 |
| 25. | 0.0114 | 0.0454 | 0.0786 | 0.1103 | 0.1399 | 0.1669 | 0.1908 | 0.2111 | 0.2274 | 0.2395 | 0.2470 | 0.2500 | 0.2482 |
| 26. | 0.1352 | 0.1637 | 0.1889 | 0.2103 | 0.2274 | 0.2399 | 0.2475 | 0.2500 | 0.2475 | 0.2399 | 0.2274 | 0.2103 | 0.1889 |

Implementation of a digital transmitter using a stored table for the sub-carrier values needs minimal computational operations, according to an embodiment of this invention. An example of a MATLAB® program that simulates the transmitter is shown below. The simulation code contains only 5 rows, that are repeated 16 times.

```
STx=[ ]; Lpr=[ ];            %Initialization
for sub=1:16
    dib=Lpr(sub)+dibit(sub);  %Differential encoding
    L=dib−4*floor(dib/4);     %Modulo 4
    sTx=WW(:,sub,L+1);        %Choosing current sub-carrier waveform
    Lpr(sub)=L;               %Saving current symbol
    STx=STx+sTx;              %Forming OFDM symbol signal
end
```

In this example, the program is performed within a loop for 16 sub-carriers (for sub=1:16) and includes 5 operations for each sub-carrier. The operations are as follows: (a) first operation—summation of the current dibit (in decimal form) with the previous one (Lpr) for each sub-carrier; (b) second operation—modulo 4 calculation of the summation; (c) third operation—choosing current sub-carrier waveform (phase) sTx from the table of pre-stored values (the table WW is a 3-dimensional matrix with coordinates: sample number, sub-carrier number, index to one of 4 versions of ±sin and ±cos functions); (d) fourth operation—saving the current transmitted symbol; and (e) fifth operation—summation of the sub-carrier waveforms.

Figure 8:
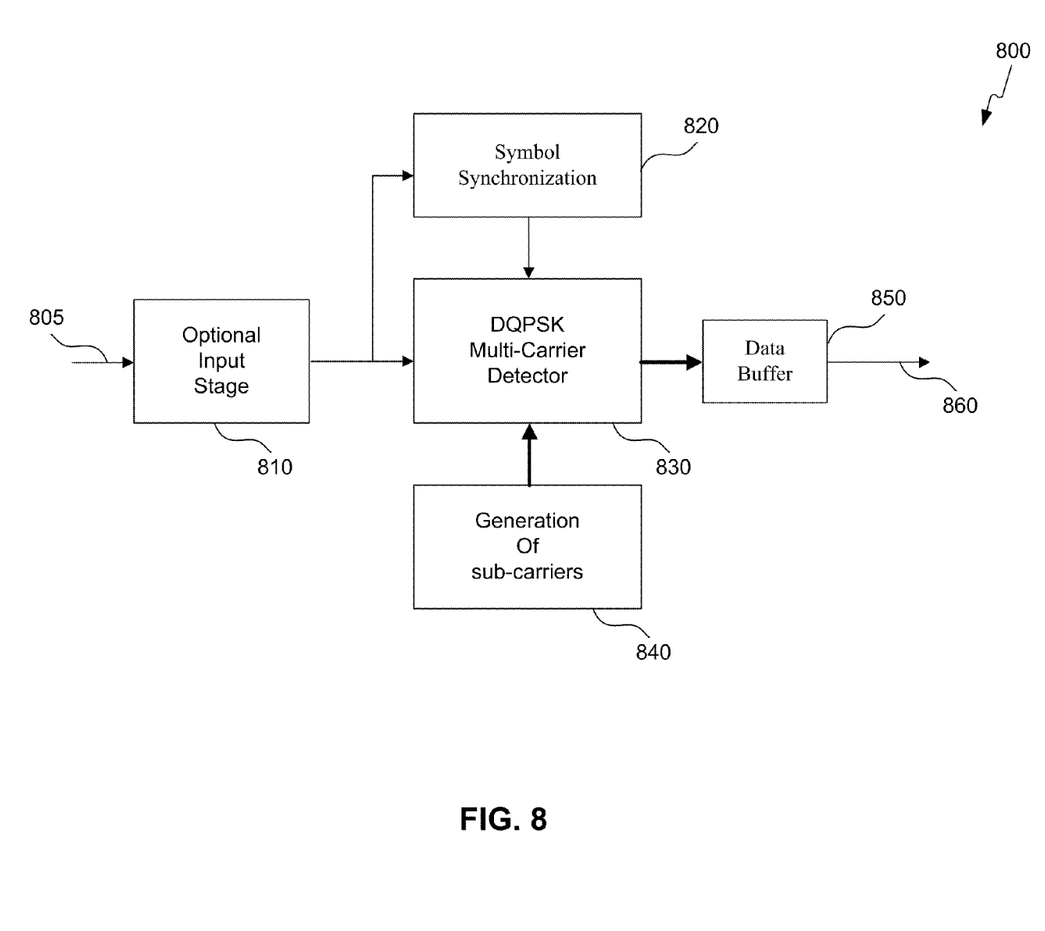
FIG. 8 is an example of an OFDM-DQPSK receiver, according to an embodiment of the present invention.

FIG. 8 shows a general block-diagram of the OFDM-DQPSK receiver 800, according to an embodiment of this invention. The received signal 805 is fed to an optional input stage 810, prior to input to a symbol synchronization unit 820 and a DQPSK multi-carrier detector 830. Such an optional input stage 810 may include functionality such as frequency downconversion, a transducer, etc., depending on the application. Using sub-carrier waveforms from a generator 840, generated in the same manner here as in the transmitter, the DQPSK detector 830 estimates the sine and cosine functions of transmitted phase differences for all K sub-carriers. Based on these estimations, the DQPSK detector 830 provides K-dibit decisions, which are transformed in the data buffer 850 into a sequence of 2K data bits 860.

Figure 9:
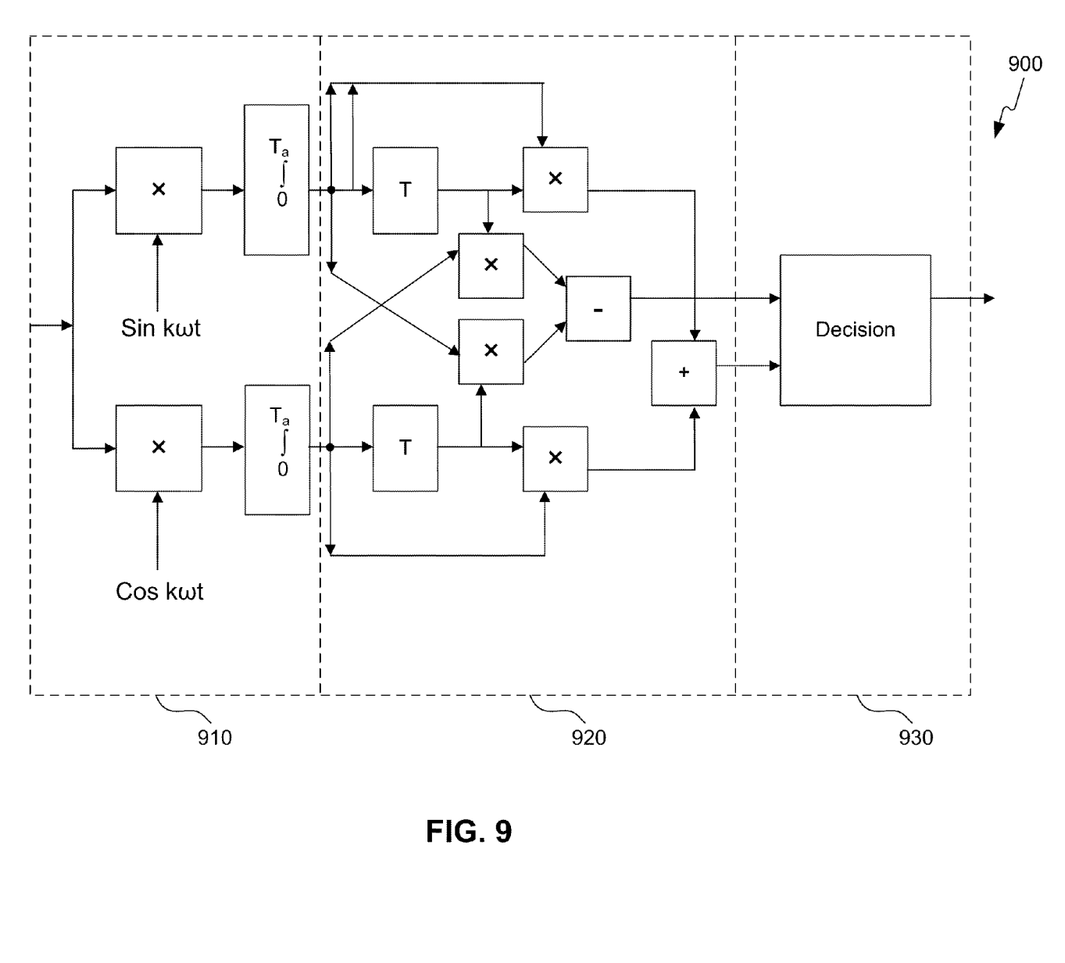
FIG. 9 is an example of a DQPSK detector for an OFDM sub-carrier, according to an embodiment of the present invention.

FIG. 9 shows a block-diagram of the DQPSK detector 900 for a sub-carrier, according to an embodiment of this invention. The DQPSK detector 900 operates according to the following multi-step algorithm.

The correlation module 910 computes the correlation coefficients between the received signal Rx(t) and the quadrature reference signals $\sin(k*2\pi/T_a)t$ and $\cos(k*2\pi/T_a)t$:

$$X_k = \int Rx(t)\sin(k*2\pi/T_a)tdt, \quad (2a)$$

$$Y_k = \int Rx(t)\cos(k*2\pi/T_a)tdt. \quad (2b)$$

The transformation module 920 computes the sine and cosine functions of the transmitted phase difference:

$$S_k = X_k X_{k*} + Y_k Y_{k*}, \quad (3a)$$

$$C_k = X_{k*} Y_k - X_k Y_{k*}, \quad (3b)$$

where $X_{k*}$ and $Y_{k*}$ are the estimates (2a) and (2b) for the previous symbol interval.

The decision module 930 determines the resulting dibit values, in accordance with Table 1, namely:

$$\text{If } |S_k|>|C_k| \text{ and } S_k>0, \text{ then dibit=00}, \quad (4a)$$

$$\text{If } |S_k|>|C_k| \text{ and } S_k<0, \text{ then dibit=11}, \quad (4b)$$

$$\text{If } |S_k|<|C_k| \text{ and } C_k>0, \text{ then dibit=01}, \quad (4c)$$

$$\text{If } |S_k|<|C_k| \text{ and } C_k<0, \text{ then dibit=10}. \quad (4d)$$

It should be noted that calculations (2), (3), and (4) are computed for each of the K sub-carriers.

The OFDM-DQPSK receiver can be also implemented digitally. In such a case, the analog-to-digital converter would be included into the receiver block-diagram FIG. 8 after the input data stream 805. The sub-carrier replicas are generated by means of reading the table, which stores functions $\sin(k*2\pi/T_a)t$ and $\cos(k*2\pi/T_a)t$ in digital form. The table contains K columns, where K is the number of sub-carriers, and rows, sufficient to represent at least one period of each sub-carrier. An example of a MATLAB® program that simulates the receiver is shown below. It contains 5 rows and decision making, each of which is repeated 16 times:

```
for sub=1:16
    X=sum(Rx.*Rs(:,sub));      %correlation of the received signal and
                                reference
    Y=sum(Rx.*Rc(:,sub));      %correlation of Rx and the quadrature
                                reference
    C=Xpr(sub)*X+Ypr(sub)*Y;   %cos of the phase difference
    S=Xpr(sub)*Y−Ypr(sub)*X;   %sin of the phase difference
    Xpr(sub)=X; Ypr(sub)=Y;    %saving current projections
    if abs(S)>abs(C)           %decision making
        if S>0
            D=0;               %dibit=00
        else
            D=3;               %dibit=11
        end
    else
        if C>0
            D=1;               %dibit=01
        else
            D=2;               %dibit=10
        end
    end
end
```

The program is performed within a loop for 16 sub-carriers (for sub=1:16) and includes 5 operations for each sub-carrier. The operations are as follows: (a) first and second operations—correlations of the received signal, Rx, and reference signals, Rs and Rc. The last ones are taken from the corresponding tables (2 dimensional matrices); (b) third and fourth operations—calculation of the trigonometric functions of the received phase difference; and (c) fifth operation—saving current correlation coefficients. The decision making procedure uses simple comparison and logic operations.

The symbol synchronization 820 in the receiver operates according to the following algorithm. Using the assumption of initial synchronization, the interval of sub-carrier orthogonality is known. Let the beginning of this interval be t+nT, where n is the symbol number, and T is the symbol duration.

Calculations are performed according to equation (2) for correlations $X_s$ and $Y_s$ of the received signal and reference signals for the missing sub-carrier. At perfect synchronization, these correlation values are equal to zero. Accordingly, the objective of the synchronization algorithm is to locate the timeframe t+nT that minimizes the length of vector $(X_s, Y_s)$. The synchronization tracking procedure can be implemented as follows.

Calculate the correlations using equation (2) for two intervals: $X_{s-}$ and $Y_{s-}$ for an advanced interval (t−Δt)+nT, and $X_{s+}$ and $Y_{s+}$ for a delayed interval (t+Δt)+nT. The squared lengths of these vectors are:

$$L_- = (X_{s-})^2 + (Y_{s-})^2, \quad (5a)$$

$$L_+ = (X_{s+})^2 + (Y_{s+})^2. \quad (5b)$$

The synchronization tracking algorithm may be realized based on the average of $L_-$ and $L_+$. Therefore, if $L_+ > L_-$, the synchronization pulse should be shifted to the left. Conversely, if $L_+ < L_-$, the synchronization pulse should be shifted to the right.

The above embodiments find applicability in a number of environments, wherein multi-path fading is significant, circuit complexity is a challenge, or computational resources prove to be a challenge.

Figure 10:
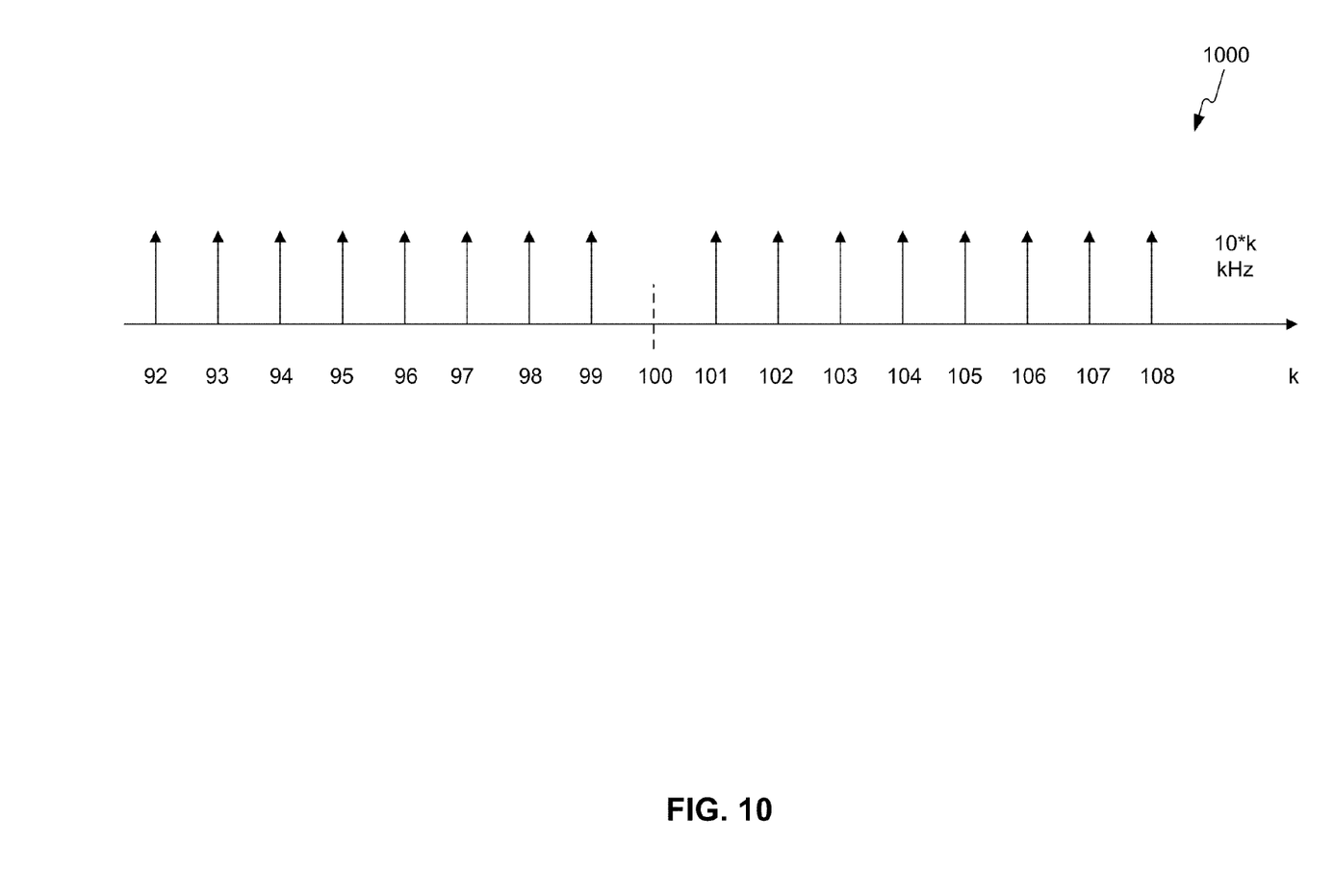
FIG. 10 is an example of an OFDM acoustical signal in the time domain, according to an embodiment of the present invention.

One such environment is an acoustic environment, where multiple reflections of waves from different objects, surface areas, surface boundaries and interfaces in the channel environment result in significant multi-path propagation. In an embodiment of the invention implemented for an acoustic environment, FIG. 10 shows a 16 sub-carrier OFDM acoustic signal in the frequency domain. The signal contains 16 harmonics of a 10 kHz oscillation, with the harmonic numbers indicated on the frequency axis. In a further embodiment of the invention, as applied to an acoustic environment, the OFDM-DQPSK acoustic data transmission system uses the $92^{nd}$ to the $108^{th}$ harmonics, resulting in sub-carrier frequencies from 920 kHz to 1080 kHz respectively. It should be noted that the $100^{th}$ harmonic, located exactly in the middle of the frequency spectrum, is not transmitted. Instead, this frequency location is used for symbol synchronization in the receiver.

For this embodiment of the invention, an examination of the time domain reveals the following. The total symbol interval is 150 μs, broken into a guard interval of 50 μs and an active interval of 100 μs. Such a time division results in a symbol transmission rate of 6.67 ksymbols per second. With the number of sub-carriers equal to 16, and the use of DQPSK modulation, the total bit rate becomes 213 kbits per second. Other choices of guard intervals, active intervals, number of sub-carriers, and sub-carrier separation can be made. Table 4 illustrates possible choices of the OFDM-DQPSK data communications system, as relevant to an embodiment in an acoustic channel environment.

TABLE 4

| $T_a$ μs | $T_g$ μs | Number of sub-carriers K | Sub-carrier Separation kHz | Bit Rate kbit/s | Bit Rate Efficiency bit/s/Hz |
|---|---|---|---|---|---|
| 100 | 100 | 16 | 10 | 160 | 1.0 |
| 100 | 50 | 16 | 10 | 213 | 1.3 |
| 100 | 25 | 16 | 10 | 256 | 1.6 |
| 75 | 75 | 16 | 13.3 | 213 | 1.0 |
| 75 | 50 | 16 | 13.3 | 256 | 1.2 |
| 75 | 25 | 16 | 13.3 | 320 | 1.5 |
| 50 | 50 | 16 | 20 | 320 | 1.0 |
| 50 | 25 | 16 | 20 | 427 | 1.3 |
| 25 | 25 | 16 | 40 | 645 | 1.0 |

The first and second columns of Table 4 show a variety of possible exemplary combinations of the active interval $T_a$ and the guard interval $T_g$ for an embodiment in an acoustic channel environment. Generally, the guard interval $T_g$ should exceed the maximum signal delay in the multi-path channel. For the example shown in Table 4, the maximum delay in the acoustic channel is assumed to be in the range 25 μs to 100 μs, depending on the carrier frequency used. It is preferred that the active interval exceed the guard interval in order to minimize energy loss. In the above example, the number of sub-carriers is chosen to be 16 in order to illustrate an embodiment of a simplified OFDM-DQPSK transmitter in an acoustic channel environment. In the exemplary combinations shown in Table 4, the active interval ranges from 25 μs to 100 μs, the sub-carrier frequency separation ranges from 10 kHz to 40 kHz, and the signal bandwidth ranges from 160 kHz to 640 kHz.

Figure 11:
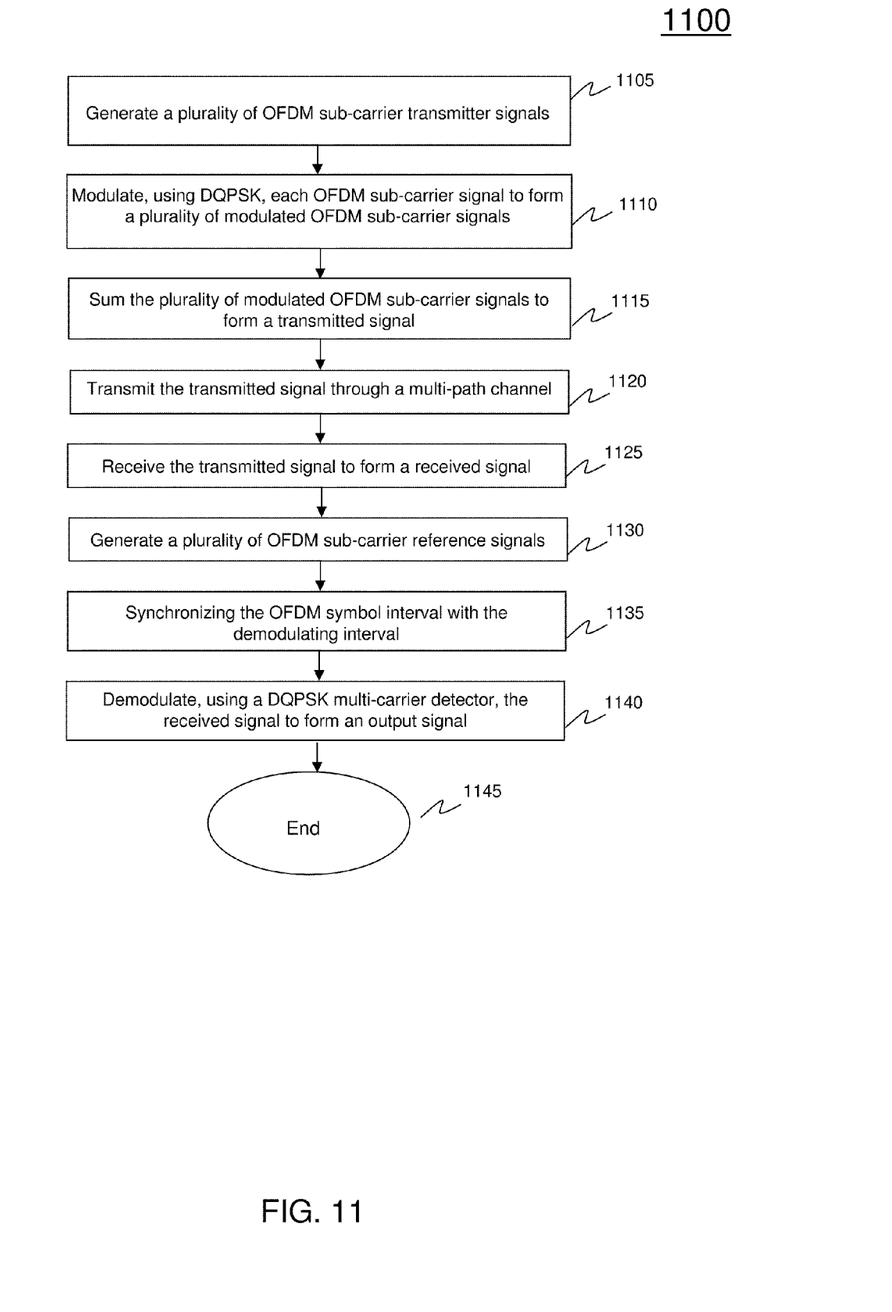
FIG. 11 is a flowchart diagram that illustrates a method for data transmission through a multi-path channel, according to an embodiment of the present invention.

FIG. 11 illustrates a flowchart 1100 for data transmission via multi-path channels using OFDM signals with DQPSK modulation, according to an embodiment of this invention. The invention described herein is not limited by the order of the steps in the flowchart 1100. In other words, some of the steps can be performed simultaneously, or in a different order, without deviating from the scope and spirit of the invention.

In step 1105, a plurality of OFDM sub-carrier transmitter signals is generated.

In step 1110, the OFDM sub-carrier signals are modulated using DQPSK to form a plurality of modulated OFDM sub-carrier signals.

In step 1115, the plurality of modulated OFDM sub-carrier signals is summed to form a transmitted signal.

In step 1120, the transmitted signal is transmitted through a multi-path channel.

In step 1125, the transmitted signal is received to form a received signal.

In step 1130, a plurality of OFDM sub-carrier reference signals is generated.

In step 1135, the OFDM symbol interval and the demodulating interval are synchronized.

In step 1140, the received signal is demodulated using a DQPSK multi-carrier detector to form an output signal.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A data communications system, for use over a multi-path channel, comprising:
    an orthogonal frequency division multiplexing (OFDM) sub-carrier signal generator that outputs a plurality of OFDM sub-carrier signals;
    a differential quadrature phase shift keying (DQPSK) modulator that modulates each OFDM sub-carrier signal in response to input data, and forms a plurality of modulated OFDM sub-carrier signals in response to input data;
    a summer that combines the plurality of modulated OFDM sub-carrier signals to form a transmitted signal;
    a receiver to output a received signal in response to the transmitted signal transmitted through the multi-path channel;
    an OFDM sub-carrier reference generator that outputs a plurality of OFDM sub-carrier reference signals;
    a synchronizer that synchronizes an OFDM symbol interval to a demodulating interval by minimizing a length of a vector formed by correlating the received signal and the plurality of OFDM sub-carrier reference signals; and
    a demodulator, using a DQPSK multi-carrier detector, that demodulates the received signal to form an output signal.

2. The data communications system of claim 1, wherein the OFDM sub-carrier signal generator uses pre-computed sample points.

3. The data communications system of claim 1, wherein the OFDM sub-carrier signal generator provides a signal for a guard interval.

4. The data communications system of claim 1, wherein the transmitted signal is an acoustical signal.

5. The data communications system of claim 1, wherein the demodulator does not use a phase tracking approach.

6. The data communications system of claim 1, wherein the DQPSK modulator comprises a decimal transformation device, a modulo-4 summation device, and a switch controller device.

7. The data communications system of claim 1, wherein the demodulator comprises a correlation device, a transformation device, and a decision device.

8. A data transmitter, for use over a multi-path channel, comprising:
    an orthogonal frequency division multiplexing (OFDM) sub-carrier signal generator that outputs a plurality of OFDM sub-carrier signals;
    a differential quadrature phase shift keying (DQPSK) modulator that modulates each OFDM sub-carrier signal in response to input data, and forms a plurality of modulated OFDM sub-carrier signals in response to input data, the plurality of modulated OFDM sub-carrier signals being pilot-free and comprising a sequence of equally-spaced modulated OFDM sub-carrier signals having a single missing modulated OFDM sub-carrier signal located at a median frequency of the plurality of modulated OFDM sub-carrier signals, wherein the DQPSK modulator comprises a decimal transformation device, a modulo-4 summation device, and a switch controller device; and
    a summer that combines the plurality of modulated OFDM sub-carrier signals to form a transmitted signal.

9. A data receiver, for use over a multi-path channel, comprising:
    a receiver to output a received signal in response to a transmitted signal transmitted through the multi-path channel;
    an orthogonal frequency division multiplexing (OFDM) sub-carrier reference generator that outputs a plurality of OFDM sub-carrier reference signals;
    a synchronizer that synchronizes an OFDM symbol interval to a demodulating interval by minimizing a length of a vector formed by correlating the received signal and the plurality of OFDM sub-carrier reference signals, wherein the plurality of OFDM sub-carrier reference signals are associated with a missed sub-carrier; and
    a demodulator, using a differential quadrature phase shift keying (DQPSK) multi-carrier detector, that demodulates the received signal to form an output signal.

10. The data receiver of claim 9, wherein the demodulator does not use a phase tracking approach.

11. The data receiver of claim 9, wherein the demodulator comprises a correlation device, a transformation device, and a decision device.

12. A method for data communications, comprising the steps of:
    generating a plurality of orthogonal frequency division multiplexing (OFDM) sub-carrier transmitter signals;
    modulating, using differential quadrature phase shift keying (DQPSK), each OFDM sub-carrier transmitter signal to form a plurality of modulated OFDM sub-carrier signals;
    summing the plurality of modulated OFDM sub-carrier signals to form a transmitted signal;
    transmitting the transmitted signal through a multi-path channel;
    receiving the transmitted signal to form a received signal;
    generating a plurality of OFDM sub-carrier reference signals;
    synchronizing an OFDM symbol interval and a demodulating interval by minimizing a length of a vector formed by correlating the received signal and the plurality of OFDM sub-carrier reference signals; and
    demodulating, using a DQPSK multi-carrier detector, the received signal to form an output signal,
    wherein the generating, modulating, summing, transmitting, receiving, generating, synchronizing and demodulating are performed by one or more circuits.

13. The method of claim 12, wherein the step of generating the plurality of OFDM sub-carrier transmitter signals uses pre-computed sample points.

14. The method of claim 12, wherein the step of generating the plurality of OFDM sub-carrier transmitter signals provides a signal for a guard interval.

15. The method of claim 12, wherein the transmitted signal is an acoustical signal.

\* \* \* \* \*